US009623979B2

(12) United States Patent
Rouyre

(10) Patent No.: US 9,623,979 B2
(45) Date of Patent: Apr. 18, 2017

(54) AIRCRAFT NACELLE COMPRISING AN IMPROVED AIR INTAKE

(71) Applicant: Airbus Operations (SAS), Toulouse (FR)

(72) Inventor: Francois Rouyre, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 20 days.

(21) Appl. No.: 14/728,593

(22) Filed: Jun. 2, 2015

(65) Prior Publication Data

US 2015/0360790 A1 Dec. 17, 2015

(30) Foreign Application Priority Data

Jun. 12, 2014 (FR) ..................................... 14 55341

(51) Int. Cl.
| | | |
|---|---|---|
| *B64D 33/02* | (2006.01) | |
| *F02C 7/045* | (2006.01) | |
| *B64D 29/00* | (2006.01) | |
| *B64C 7/02* | (2006.01) | |

(52) U.S. Cl.
CPC ................ *B64D 33/02* (2013.01); *B64C 7/02* (2013.01); *B64D 29/00* (2013.01); *F02C 7/045* (2013.01); *B64D 2033/0206* (2013.01); *B64D 2033/0226* (2013.01); *F05D 2250/184* (2013.01); *F05D 2250/611* (2013.01)

(58) Field of Classification Search
CPC ... F02C 7/02; F02C 7/04; F02C 7/045; B64D 33/02; B64D 2033/0206; B64D 2033/0226; B64D 2033/0273; B64D 2033/0286; B64C 7/02

USPC ....................................................... 244/53 B
See application file for complete search history.

(56) References Cited

U.S. PATENT DOCUMENTS

| | | | | |
|---|---|---|---|---|
| 3,611,724 A | * | 10/1971 | Kutney .................. | F02C 7/042 137/15.1 |
| 3,664,612 A | * | 5/1972 | Skidmore et al. ..... | B64D 33/02 137/15.1 |
| 4,786,016 A | * | 11/1988 | Presz, Jr. .................. | B63B 3/38 138/37 |
| 2005/0274103 A1 | * | 12/2005 | Prasad .................. | B64D 33/02 60/226.1 |

(Continued)

FOREIGN PATENT DOCUMENTS

| | | |
|---|---|---|
| EP | 1607603 | 12/2005 |
| EP | 2607657 | 6/2013 |

(Continued)

OTHER PUBLICATIONS

French Search Report, Feb. 2, 2015.

*Primary Examiner* — Richard G Davis
(74) *Attorney, Agent, or Firm* — Greer, Burns & Crain, Ltd.

(57) ABSTRACT

An aircraft nacelle comprising an air intake configured to channel an air flow in the direction of an engine assembly which comprises a fan with an axis of rotation, said air intake comprising, according to a flow direction of the air flow, a lip with a leading edge and an internal conduit which extends said lip towards the fan, wherein the air intake comprises a plurality of protrusions distributed over the circumference of the air intake and following each protrusion, a concave form configured in order to achieve compression of the air flow.

9 Claims, 4 Drawing Sheets

(56) References Cited

U.S. PATENT DOCUMENTS

| | | |
|---|---|---|
| 2011/0006165 A1 | 1/2011 | Ireland |
| 2013/0101403 A1* | 4/2013 | Presz, Jr. .................. F03D 1/04 415/182.1 |
| 2013/0266419 A1 | 10/2013 | Richardson et al. |

FOREIGN PATENT DOCUMENTS

| | | |
|---|---|---|
| GB | 1171508 | 11/1969 |
| WO | 9101034 | 1/1991 |

\* cited by examiner

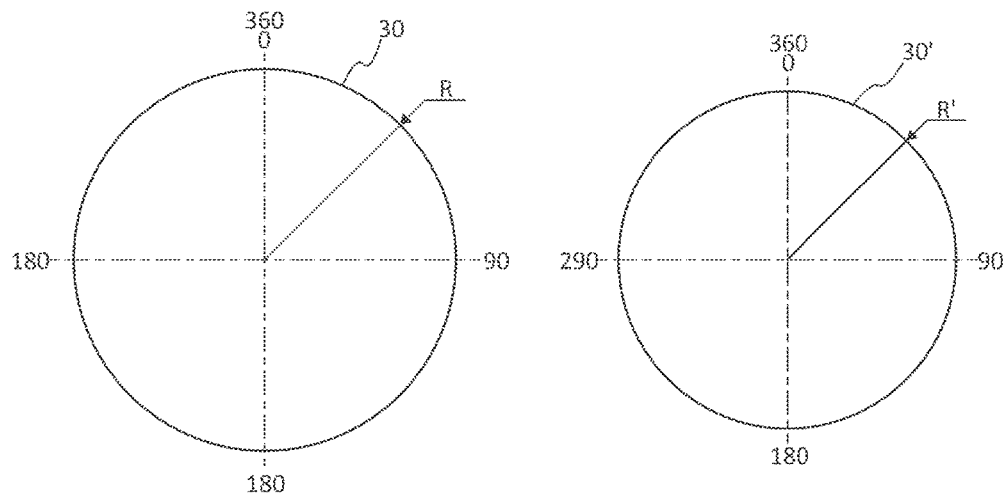
FIG. 3B
Prior Art
FIG. 3C
Prior Art
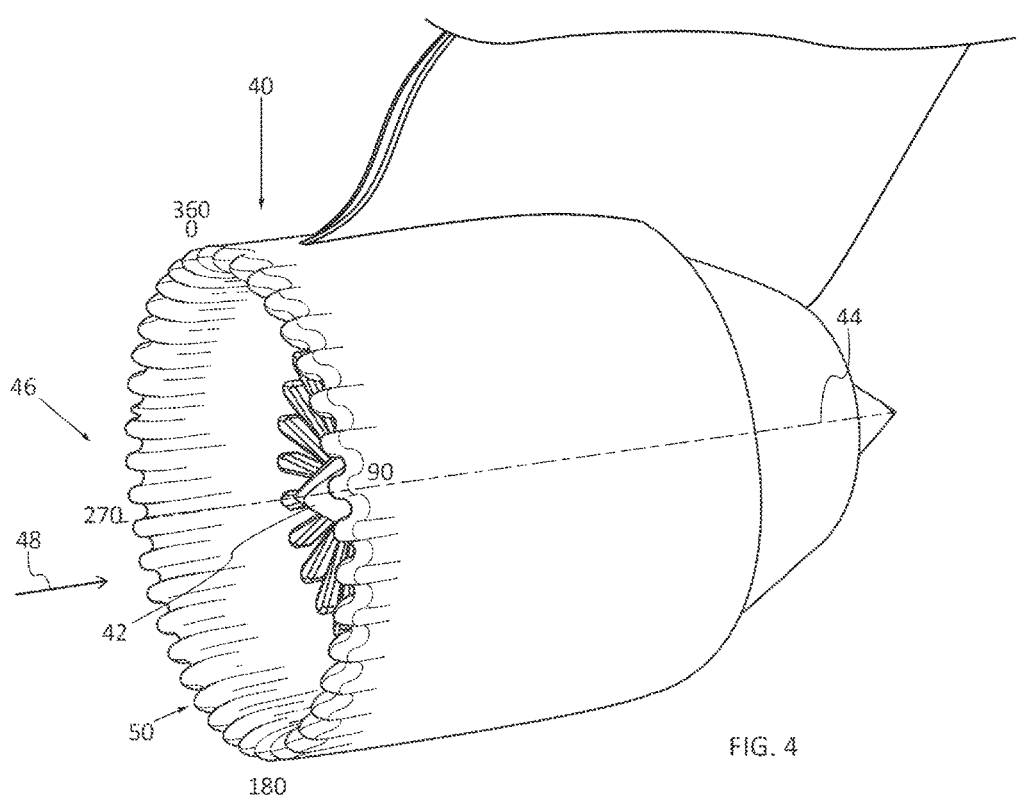
FIG. 4

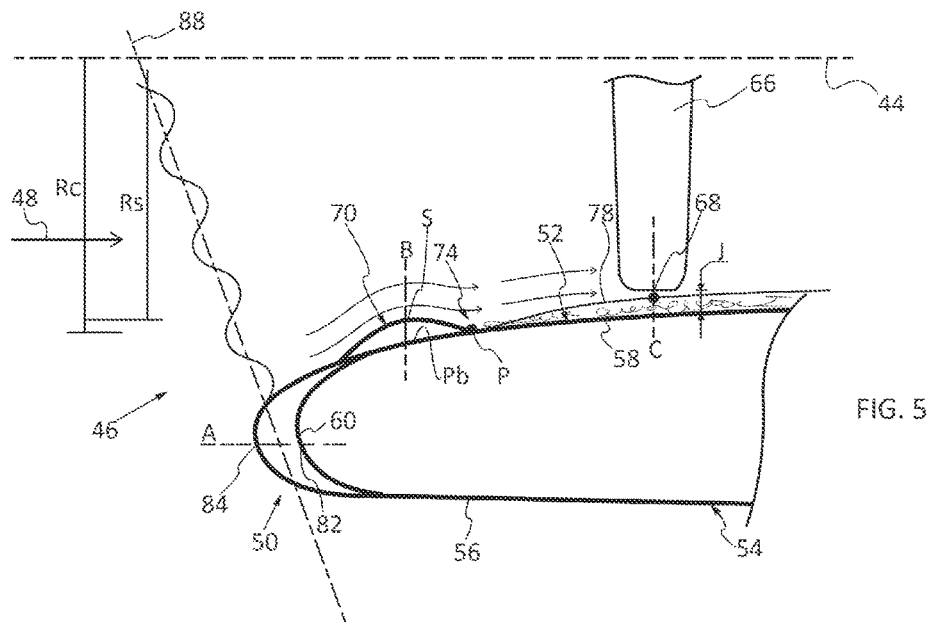
FIG. 5
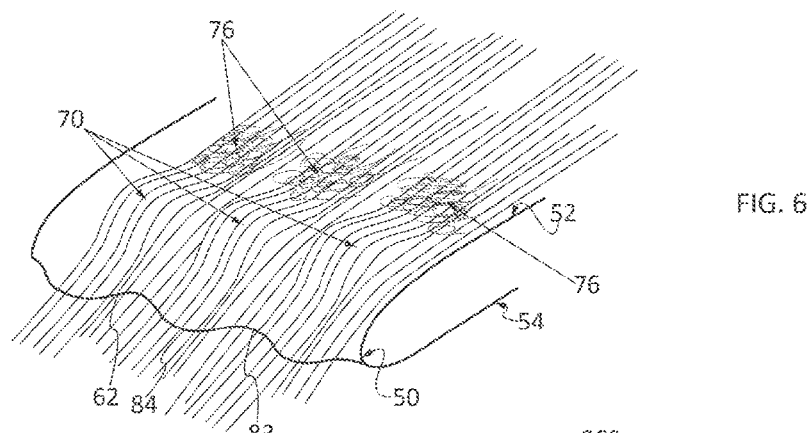
FIG. 6
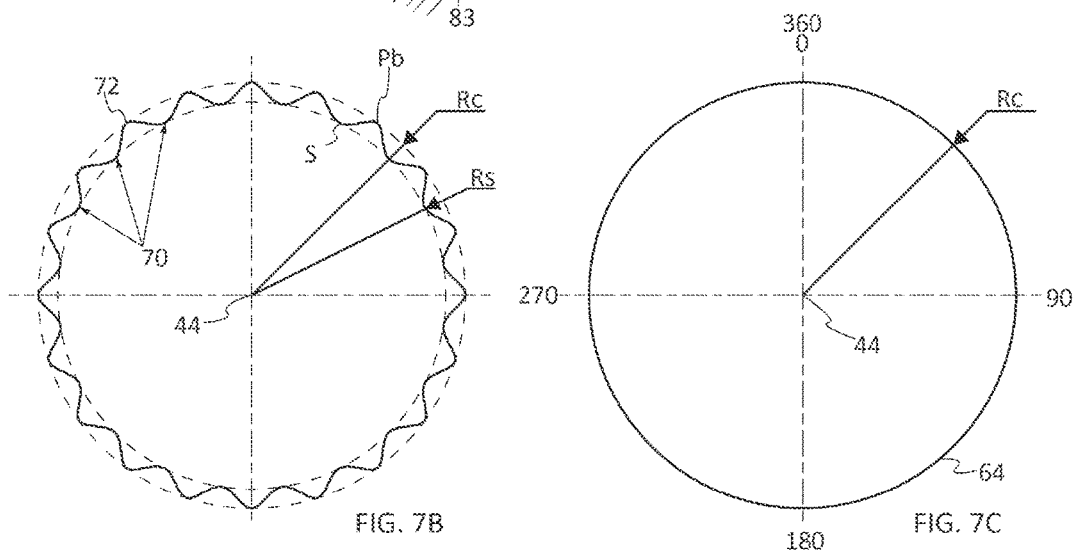
FIG. 7B
FIG. 7C

AIRCRAFT NACELLE COMPRISING AN IMPROVED AIR INTAKE

CROSS-REFERENCES TO RELATED APPLICATIONS

This application claims the benefit of the French patent application No. 1455341 filed on Jun. 12, 2014, the entire disclosures of which are incorporated herein by way of reference.

BACKGROUND OF THE INVENTION

The present invention relates to an aircraft nacelle comprising an improved air intake.

As shown in FIG. 1, an aircraft nacelle 10 comprises an air intake 12 at the front allowing an air flow to be channeled in the direction of an engine assembly, a first portion of the incoming air flow, referred to as the primary flow, passing through the turbojet to take part in the combustion process, the second portion of the air flow, referred to as the secondary flow, being entrained by a fan 14 and flowing in an annular conduit delimited by the internal wall of the nacelle and the external wall of the turbojet.

In the description below, the longitudinal direction corresponds to the direction of the axis of rotation 16 of the fan 14. A longitudinal plane is a plane that passes through the axis of rotation 16. A transverse plane is a plane perpendicular to the axis of rotation 16.

As illustrated in FIG. 2, the air intake 10 comprises a lip 18, the surface whereof in contact with the aerodynamic flows is extended on the inside of the nacelle by an internal conduit 20 that is substantially circular and on the outside of the nacelle by an external wall 22 that is substantially circular. The lip 18 allows an air flow 24 to be channeled to the inside of the internal conduit 20.

In a longitudinal plane, the air intake 12 has a section with a portion that is substantially straight at the level of the internal conduit 20, a portion that is substantially straight at the level of the external wall 22 and a curved intermediate portion with a small bending radius at the level of the lip 18.

This curved intermediate portion has a vertex A which corresponds to the foremost point of the lip 18. This vertex A describes an approximately circular profile 26 along the circumference of the nacelle 10, as illustrated in FIG. 1. This profile 26 corresponds to the leading edge of the air intake.

According to the prior art, this profile 26 is inscribed in a plane 28. This plane 28 is preferably not perpendicular to the axis of rotation 16 of the fan 14 and forms an angle in the order of 75 to 105° with this axis of rotation 16, such that the vertex of the air intake situated at the top of the nacelle, which corresponds to an angular position of 0°, is further forward than the vertex of the air intake situated at the bottom of the nacelle, which corresponds to an angular position of 180°.

FIG. 3A shows the opened-out profile 26 described by the vertex A in relation to a reference plane perpendicular to the axis of rotation 16 of the fan 14.

Because the plane 28 is inclined relative to the axis of rotation 16, the profile 26 approximately describes a single sine curve with an amplitude E which corresponds to the gap in the longitudinal direction between the vertex of the air intake situated at the top of the nacelle and that situated at the bottom.

FIGS. 3B and 3C show a transverse section through the internal conduit 20 at a point B of the air intake and at a point C of the air intake.

Points B and C each approximately describe a circle of radius R and radius R', respectively, as illustrated in FIGS. 3B and 3C.

When the air flow penetrates the air intake 12, depending on the flight phase of the aircraft (climbing, cruising, descent), the air flow may break away at the junction zone between the lip 18 and the internal conduit 20, causing an increase in thickness of the boundary layer 32 on the surface of the internal conduit 20, as illustrated in FIG. 2. Since the thickness of the boundary layer 32 is greater than the clearance allowed between the internal conduit 20 and the ends of the blades 34, said blades are not in a longitudinal laminar flow, but interfere with the boundary layer 32. The interaction between the ends of the blades 34 and the turbulent flows of the boundary layer 32 generates a noise source.

In order to limit the impact of unwanted noise, techniques have been developed to reduce noise, notably by providing panels or casings at the internal conduit walls 20, said panels or casings being intended to absorb part of the noise energy, particularly by applying the principle of Helmholtz resonators.

Even if these panels or casings are efficient, they simply attenuate the noises emitted by certain engine sources and are not intended to limit their emergence.

SUMMARY OF THE INVENTION

The present application is intended to improve the aerodynamic characteristics of the air intake, in order to limit the emergence of noises.

To this end, an aim of the invention is an aircraft nacelle comprising an air intake configured to channel an air flow in the direction of an engine assembly which comprises a fan with an axis of rotation, said air intake comprising, according to a flow direction of the air flow, a lip with a leading edge and an internal conduit which extends said lip towards the fan, characterized in that the air intake comprises a plurality of protrusions distributed over the circumference of the air intake and after each protrusion a concave form configured in order to achieve compression of the air flow.

This compression causes an acceleration of the air flow in contact with the internal conduit and therefore a reduction in the thickness of the boundary layer on the surface of the internal conduit. In this way, the ends of the blades no longer interfere with the turbulent flows of the boundary layer, which limits the emergence of noises.

Each protrusion advantageously has a profile in the flow direction of the air flow, such that the diameter of the air intake diminishes continuously from a downstream foot of the protrusion to a vertex of the protrusion then increases continuously from the vertex of the protrusion to the concave form.

According to another characteristic, each concave form has a low point which is distal to the axis of rotation by a distance equal to the radius of the internal conduit on a same transverse plane.

The air intake preferably comprises at least thirty-two protrusions distributed at regular intervals over its circumference.

According to other characteristics:
the protrusions are distributed on a plane parallel to the leading edge;
the protrusions are disposed at a junction zone between the lip and the internal conduit;

the protrusions form a succession of hollow forms and projecting forms with a sinusoidal profile in a plane parallel to the leading edge;

each protrusion has a height of between 1 and 5 cm;

each protrusion comprises a vertex and an upstream foot separated by a distance in a direction parallel to the axis of rotation that is shorter than or equal to twice the height.

The leading edge advantageously has a profile alternately comprising hollow forms and projecting forms, a projecting form being separated from the fan by a greater distance than the adjacent hollow forms.

The profile of the leading edge preferably describes a succession of hollow forms and of projecting forms distributed on both sides of a plane that forms an angle of between 75 and 105° relative to the axis of rotation of the fan.

According to one embodiment, the projecting forms have a bending radius smaller than the bending radius of the hollow forms.

BRIEF DESCRIPTION OF THE DRAWINGS

Other characteristics and advantages will emerge from the following description of the invention, a description given purely by way of example, with regard to the attached drawings in which:

FIGS. 3B and 3C are transverse sections at a point B and a point C of an air intake of the prior art, FIG. 4 is a perspective view of an aircraft nacelle illustrating the invention, FIG. 5 is a longitudinal section through part of an air intake of the nacelle in FIG. 4, FIG. 6 is a perspective view illustrating surface air flows of a sector of the air intake of the nacelle in FIG. 4, FIG. 7B is a transverse section at a point B of the air intake in FIG. 5, FIG. 7C is a transverse section at a point C of the air intake in FIG. 5.

DETAILED DESCRIPTION OF THE PREFERRED EMBODIMENTS

Figure 1:
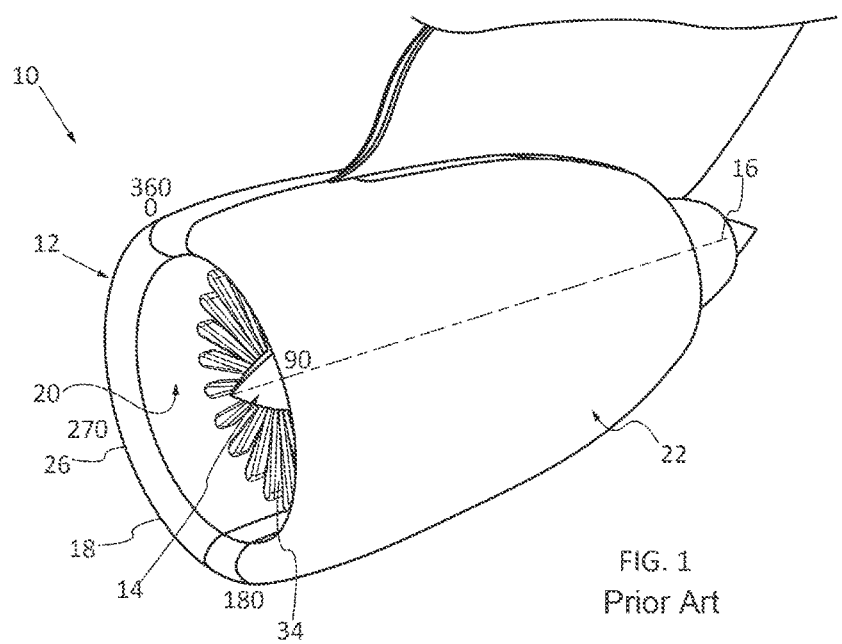
FIG. 1 is a perspective view of an aircraft nacelle which illustrates the prior art.
Figure 2:
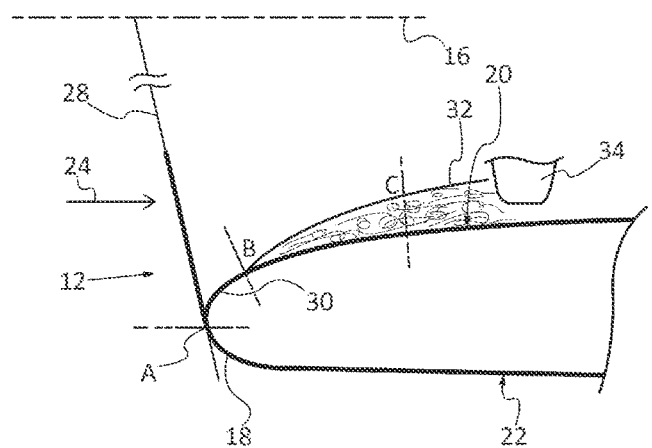
FIG. 2 is a longitudinal section through part of an air intake which illustrates the prior art.
Figure 3A:
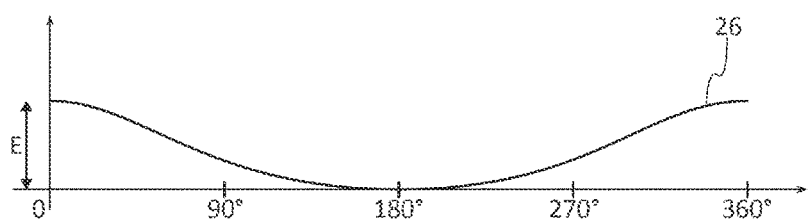
FIG. 3A is a curve of an opened-out profile of the leading edge of an air intake from the prior art.

An aircraft nacelle 40 comprises an air intake 46 at the front configured to channel an air flow 48 in the direction of an engine assembly which incorporates a fan 42 with an axis of rotation 44. Hereafter, the axis of rotation 44 corresponds to the longitudinal direction.

As illustrated in FIG. 5, the air intake 46 comprises a lip 50, an internal conduit 52 that is substantially circular and extends the lip 50 on the inside of the nacelle. The lip 50 is extended outside the nacelle by a substantially circular external wall 54.

In a longitudinal plane that can be seen in FIG. 5, the outside wall and the air intake 46 have a longitudinal section that comprises a first straight portion 56 corresponding to the external wall 54, a second straight portion 58 corresponding to part of the internal conduit 52 and a curved intermediate portion 60 corresponding to the lip 50.

The lip 50 comprises a vertex A which corresponds to the foremost point of the nacelle for each longitudinal plane. The vertex A describes along the circumference of the nacelle a closed curve forming a leading edge 62. This leading edge 62 allows the air flow to be split in two—a first flow penetrating the air intake 46 and another air flow passing to the outside of the nacelle.

The internal conduit 52 comprises a transverse section (perpendicular to the longitudinal direction) to the right of the circular fan 42. Hence, as illustrated in FIG. 7C, a point C on the internal conduit 52 describes a circular profile 64 with a radius Rc.

The fan 42 comprises a plurality of blades 66 each with an end 68 separated by a clearance J from the internal conduit 52.

According to one characteristic of the invention, the air intake 46 comprises a plurality of protrusions 70 distributed over the circumference of the air intake 46. The protrusions 70 are advantageously distributed on a plane parallel to the leading edge 62. This succession of protrusions 70 forms a profile 72, represented in FIG. 7B, comprising alternating hollow and projecting forms.

Each hollow form has a low point Pb. All the low points Pb are preferably disposed on the same circle which is centered on the axis of rotation 44 and which has a radius equal to the radius Rc of the internal conduit 52.

Each projecting form which corresponds to a protrusion 70 has a vertex S which corresponds to the highest point. All the vertices are preferably disposed on the same circle which is centered on the axis of rotation 44 and which has a radius Rs smaller than the radius Rc.

Each protrusion 70 advantageously has a height in the order of 1 to 5 cm.

Hence, the gap between the radii Rc and Rs is in the order of 1 to 5 cm.

According to one characteristic of the invention, the air intake 46 comprises at least thirty-two (32) protrusions 70 distributed at regular intervals over the circumference of the air intake 46, in order to achieve the desired effect.

According to one embodiment, the profile 72 formed by alternating hollow forms and projecting forms is a sine curve mounted on a circle with a radius equal to (Rc+Rs)/2.

However, the invention is not limited to this geometry for the protrusions 70.

According to another characteristic of the invention, for each protrusion 70, the vertex S is disposed on a circle with a radius Rs smaller than that of a point P of the air intake 46 situated just behind the protrusion 70. Hence, as shown in FIG. 5, in a longitudinal plane, each protrusion has, in the flow direction of the air flow 48, a profile such that the diameter of the air intake 46 diminishes continuously from a downstream foot of the protrusion to the vertex S thereof then increases continuously from the vertex S to an upstream foot P of the protrusion. In this way, the air intake 46 comprises after each protrusion 70 a concave form 74 at the upstream foot P configured in order to obtain a compression 76 (can be seen in FIG. 6) of the air flow. This compression causes an acceleration of the air flow in contact with the internal conduit 52 and therefore a reduction in the thickness of the boundary layer 78 at the surface of the internal conduit 52.

Each concave form 74 preferably has a low point which corresponds to point P which is distal to the axis of rotation 44 by a distance equal to the radius of the internal conduit 52 on the same transverse plane.

As shown in FIG. 5, this boundary layer 78 has a thickness smaller than the clearance J between the ends 68 of the blades 66 and the internal conduit 52. In this way, the ends 68 of the blades 66 no longer interfere with the turbulent flows of the boundary layer 78, which limits the emergence of noises.

The distance between the vertex S and the downstream foot P in the longitudinal direction is preferably shorter than or equal to twice the distance between the vertex S and the upstream foot P in the transverse direction corresponding to the height of the protrusion.

The protrusions 70 are advantageously placed at the theoretical position at which the air flow breaks away in the absence of protrusions. According to one embodiment, the protrusions 70 are positioned at the junction zone between the lip 50 and the internal conduit 52.

According to one embodiment, each protrusion 70 has an identical profile in all planes containing a straight line passing through the vertex S and perpendicular to the axis of rotation 44.

The presence of protrusions 70 according to the invention at the air intake 46 produces the following advantages:

The protrusions 70 restrict the break-away of the air flow entering the air intake 46, which tends to reduce the thickness of the boundary layer 78 on the surface of the internal conduit 52. In this way, the ends 68 of the fan blades 66 no longer interfere with the turbulent flows of the boundary layer 78, which on the one hand reduces the emergence of noise and, on the other hand, improves the fan's efficiency.

According to another advantage, the succession of hollow forms and projecting forms on the circumference of the air intake 46 allows the air flows oriented in the longitudinal direction to be preserved and prevents them from swirling, which likewise helps to improve the fan's efficiency.

According to another characteristic of the invention illustrated in FIGS. 5, 7A, 8 and 9, the leading edge 62 has a profile 80, 80', 80" that comprises hollow forms 82 and projecting forms 84 in alternating fashion, a projecting form being separated from the fan by a greater distance than the adjacent hollow forms.

This configuration improves the aerodynamic characteristics of the air intake.

Figure 7A:
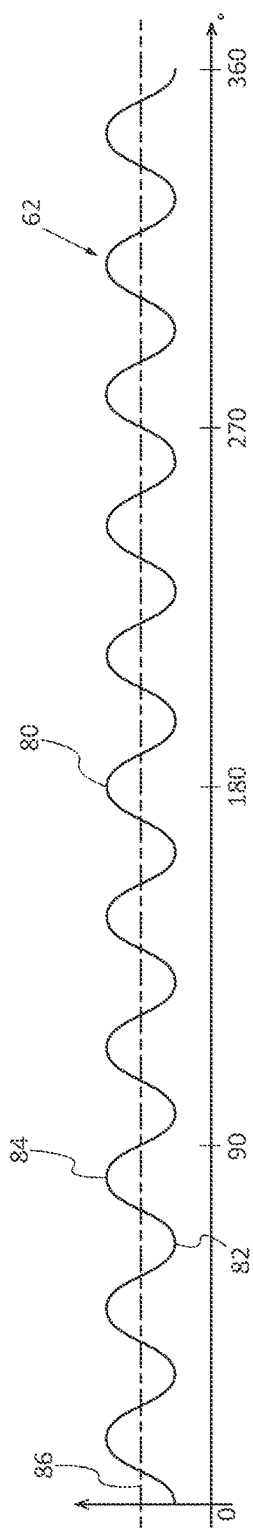
FIG. 7A is a curve illustrating the opened-out profile described by the leading edge of the air intake in FIG. 4.

According to a first embodiment depicted in FIG. 7A, the profile 80 of the leading edge 62 describes a sine curve centered in relation to a plane 86 perpendicular to the axis of rotation 44 of the fan.

Figure 9:
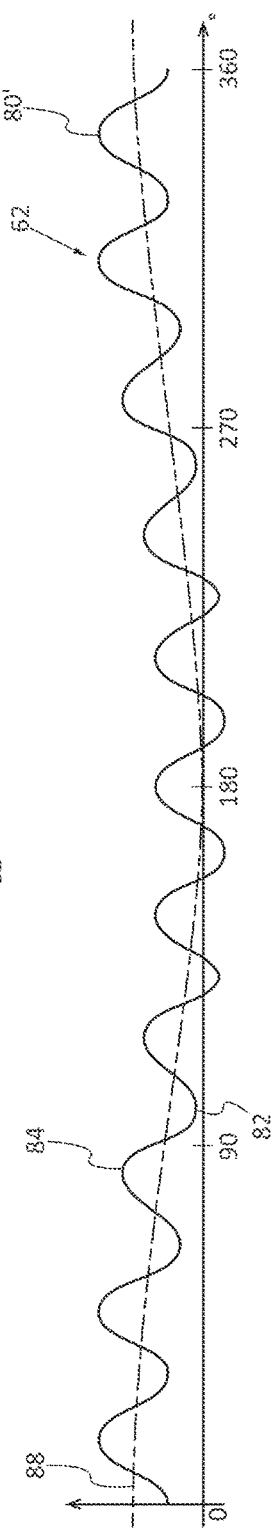
FIG. 9 is a curve illustrating an opened-out profile described by the leading edge of an air intake according to another variant of the invention.

According to another embodiment depicted in FIGS. 5 and 9, the profile 80' of the leading edge 62 describes a succession of hollow forms 82 and projecting forms 84 distributed on both sides of a plane 88 that forms an angle of between 75 and 105° relative to the axis of rotation 44 of the fan.

Figure 8:
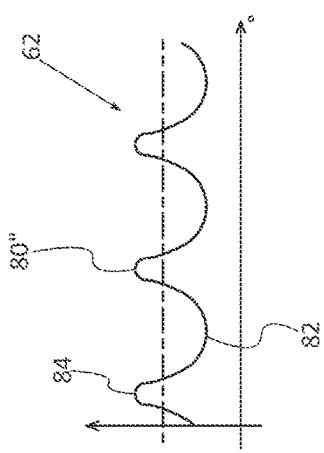
FIG. 8 is a curve which illustrates an opened-out profile described by the leading edge of an air intake according to another variant of the invention.

According to another embodiment depicted in FIG. 8, the hollow forms 82 and the projecting forms 84 are not symmetrical. According to this embodiment, all the hollow forms 82 are identical, all the projecting forms 84 are identical and the projecting forms 84 have a bending radius that is smaller than the bending radius of the hollow forms 82.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft nacelle comprising:
    an air intake configured to channel an air flow in the direction of an engine assembly which comprises a fan with an axis of rotation, said air intake comprising, according to a flow direction of the air flow,
        a lip with a leading edge having a profile alternately comprising hollow forms and projecting forms, a projecting form being separated from the fan by a greater distance than the adjacent hollow forms
        an internal conduit which extends said lip towards the fan,
        a plurality of protrusions distributed over the circumference of the air intake, and,
        after each protrusion, a concave form configured in order to achieve compression of the air flow.

2. The aircraft nacelle according to claim 1, wherein the profile of the leading edge describes a succession of hollow forms and of projecting forms distributed on both sides of a plane that forms an angle of between 75 and 105° relative to the axis of rotation of the fan.

3. The aircraft nacelle according to claim 1, wherein the projecting forms have a bending radius smaller than the bending radius of the hollow forms.

4. The aircraft nacelle according to claim 1, wherein each protrusion has, in the flow direction of the air flow, a profile such that the diameter of the air intake diminishes continuously from a foot of the protrusion to a vertex of the protrusion then increases continuously from the vertex of the protrusion to the concave form.

5. The aircraft nacelle according to claim 1, wherein each concave form has a low point which is distal to the axis of rotation by a distance equal to the radius of the internal conduit on a same transverse plane.

6. The aircraft nacelle according to claim 1, wherein the air intake comprises at least thirty-two protrusions distributed at regular intervals over its circumference.

7. The aircraft nacelle according to claim 1, wherein the protrusions are disposed at a junction zone between the lip and the internal conduit.

8. The aircraft nacelle according to claim 1, wherein the protrusions form a succession of hollow forms and projecting forms with a sinusoidal profile in a plane parallel to the leading edge.

9. The aircraft nacelle according to claim 1, wherein each protrusion comprises a vertex and an upstream foot separated by a distance in a direction parallel to the axis of rotation that is shorter than or equal to twice the height.

* * * * *